(No Model.)
J. KREMSER.
SMOKE HOUSE.
No. 325,417. Patented Sept. 1, 1885.
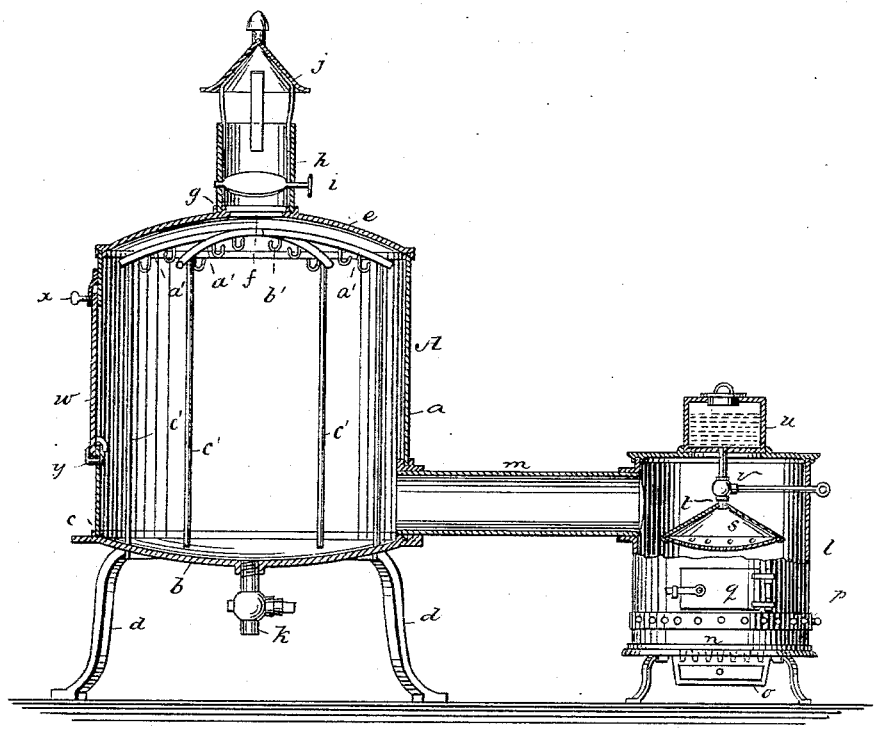
WITNESSES
Rufus Y. Kirkland
John Reed
INVENTOR
Joseph Kremser

UNITED STATES PATENT OFFICE.

JOSEPH KREMSER, OF SPRINGFIELD, NEW YORK.

SMOKE-HOUSE.

SPECIFICATION forming part of Letters Patent No. 325,417, dated September 1, 1885.

Application filed March 25, 1885. (No model.)

*To all whom it may concern:*

Be it known that I, JOSEPH KREMSER, a citizen of the United States, residing at Springfield, in the county of Queens and State of New York, have invented new and useful Improvements in Smoke-Houses, of which the following is a specification.

My invention consists of a small air-tight portable metallic smoke-house provided with hooks within the upper part, and supporting devices for the hooks adapted for hanging up the meat to be smoked, and having a concave bottom with a cock at the lowest part adapted for collecting the drippings from the meat and drawing them off from time to time, together with a stove located at one side of the tank for producing the smoke, the pipe of which connects with and discharges into the side of the house, so as not to interfere with the grease-pan at the bottom, and the house has a discharge-pipe at the top protected with a rain-cap and adapted for connection with a draft-chimney, if desired, and there is a sprinkler attachment to the stove for smothering the fire to facilitate the production of smoke, all making a small, light, simple, and efficient apparatus in which the curing of meat by smoke may be more rapidly and economically carried on than in the smoke-houses of ordinary contrivance, with complete protection of the same from direct rays of heat from the fire, and enabling all the grease to be saved in a clean condition, as hereinafter fully described, reference being made to the accompanying drawing, which is a sectional elevation of my improved smoke-house and stove.

The house, which is represented at A, may be constructed in any approved manner—as a cylindrical sheet-metal body, $a$, set upright on a cast or stamped concave bottom, $b$, having a retaining-flange, $c$, and supporting-legs $d$, the latter being detachable, in the manner of stove-legs. The body is covered with a top, $e$, of similar form as the bottom, but inverted, and having the central smoke-passage, $f$, surrounded with a flange, $g$, for the connection of a smoke-pipe, $h$, on the top of which a rain-cap, $j$, may be employed when the house is to stand apart from any other; but the pipe $h$ may be connected with the chimney of any other building when preferred. I arrange the hooks $b'$ for hanging up the meat on two or more rods or bars, $a'$, which are preferably curved in conformity with the dome shape of the cover, and supported at the ends on rods $c'$, extending down to and resting on the bottom of the house, the bars $a'$ being arranged crosswise of each other at the center of the top of the house and radiating therefrom. This arrangement of the supporting hooks and bars enables them to be removed readily from time to time for being cleaned, and to facilitate the cleaning of the upper part of the house.

The cock for drawing off the grease from the pan $b$ is represented at $k$, where it is connected with the lowest part of the pan for enabling all of the grease to run out.

The smoke-generating stove $l$ may be a small sheet or cast iron device, as preferred, with its pipe $m$ connected into the side of the smoke-house near the bottom, and will have a suitable fire-grate, $n$, ash-pan $o$, air-inlets and register $p$, and fuel-door $q$. In the upper part of this stove, or it may be on the top, I arrange a sprinkler, $s$, of any approved kind, adapted for sprinkling the fuel on the fire-grate in the stove, and having connection by a pipe, $t$, with a reservoir, $u$, on the top of the stove or other approved support, said pipe having a cock, $v$, for regulating the quantity of water to be discharged on the fire, the stem of the cock being extended out through the side of the stove for convenience in manipulating the cock.

A door, $w$, is also provided in one side of the house, through which to put in and take out the meat, and in practice this door will be provided with screws $x$, buttons $y$, or other devices for clamping it up tight to the case when closed to prevent draft to interfere with the draft through the fire. In this example the door is represented in an arrangement for sliding back and forth for opening and closing, but it may be hinged, if preferred.

What I claim, and desire to secure by Letters Patent, is—

1. The improved smoke-house, consisting of the concave flanged bottom $b$, cylindrical body $a$, and dome-shaped top $e$, constructed substantially as described, and having the inlet-pipe for the smoke connected at one side and the discharge-pipe at the top, substantially as herein set forth.

2. The combination, with the smoke-house, of a smoke-generator arranged externally to the same and having a sprinkler attachment adapted for smothering the fire to increase the smoke, substantially as described.

3. The combination, in a meat-smoking apparatus, of the house having a concave bottom, $b$, the smoke-generator arranged externally to the smoke-house, and connected therewith by its smoke-pipe, and the sprinkler $s$, applied to said generator, and having a regulating-cock and supply-tank, substantially as described.

In witness whereof I have hereunto signed my name in the presence of two subscribing witnesses.

JOSEPH KREMSER.

Witnesses:
RUFUS Y. KIRKLAND,
JOHN REED.